(12) United States Patent
Bruder et al.

(10) Patent No.: US 7,856,078 B2
(45) Date of Patent: Dec. 21, 2010

(54) METHOD AND X-RAY CT SYSTEM FOR GENERATING COMPUTED TOMOGRAPHY DISPLAYS

(75) Inventors: Herbert Bruder, Höchstadt (DE); Rainer Raupach, Heroldsbach (DE); Bernhard Schmidt, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 253 days.

(21) Appl. No.: 12/153,416

(22) Filed: May 19, 2008

(65) Prior Publication Data
US 2008/0292171 A1 Nov. 27, 2008

(30) Foreign Application Priority Data
May 25, 2007 (DE) ............ 10 2007 024 409

(51) Int. Cl.
*A61B 6/00* (2006.01)
(52) U.S. Cl. .................. 378/15; 378/4; 378/9
(58) Field of Classification Search ........ 378/4, 378/15
See application file for complete search history.

(56) References Cited

U.S. PATENT DOCUMENTS

| | | | |
|---|---|---|---|
| 5,406,479 A * | 4/1995 | Harman | 378/7 |
| 5,625,662 A | 4/1997 | Toth et al. | |
| 6,252,926 B1 * | 6/2001 | Flohr et al. | 378/15 |
| 6,272,199 B1 | 8/2001 | Sembritzki et al. | |
| 6,327,326 B1 | 12/2001 | Flohr et al. | |
| 6,504,893 B1 | 1/2003 | Flohr et al. | |
| 7,058,157 B2 | 6/2006 | Rauscher et al. | |
| 2004/0174946 A1 * | 9/2004 | Hsieh | 378/4 |
| 2004/0218711 A1 * | 11/2004 | Rauscher et al. | 378/15 |
| 2007/0092056 A1 | 4/2007 | Flohr et al. | |
| 2008/0192886 A1 * | 8/2008 | Pack | 378/15 |

FOREIGN PATENT DOCUMENTS

| | | |
|---|---|---|
| DE | 19851556 | 11/2000 |
| DE | 19957082 | 8/2001 |

\* cited by examiner

*Primary Examiner*—Edward J Glick
*Assistant Examiner*—Alexander H Taningco
(74) *Attorney, Agent, or Firm*—Harness, Dickey & Pierce, P.L.C.

(57) ABSTRACT

A method is disclosed for generating computed tomography displays, in which with the aid of at least one X-ray source, an examination object is scanned in a rotationally circulating fashion with a measured dose rate dependent on the circulation angle, projection data are collected from a multiplicity of viewing angles, and at least similarly redundant projection data from angularly identical or angularly complementary projection angles with a different measured dose are interpolated with distance weighted relative to a projection value and are used for reconstruction. According to at least one embodiment of the invention, during the distance weighted interpolation of the at least similarly redundant projection data an additional noise optimizing weighting is carried out as a function of the noise present per projection value. Furthermore, an X-ray computed tomography system is disclosed for generating tomographic displays of an examination object with the aid of an arithmetic logic unit, including computer program code for evaluating detector data and carrying out a reconstruction, the arithmetic logic unit including program code that during operation executes at least one embodiment of the method.

23 Claims, 2 Drawing Sheets

METHOD AND X-RAY CT SYSTEM FOR GENERATING COMPUTED TOMOGRAPHY DISPLAYS

PRIORITY STATEMENT

The present application hereby claims priority under 35 U.S.C. §119 on German patent application number DE 10 2007 024 409.8 filed May 25, 2007, the entire contents of which is hereby incorporated herein by reference.

FIELD

Embodiments of the invention generally relate to a method and/or an X-ray CT system for generating computed tomography displays. More particularly, they may relate to one in which, with the aid of at least one X-ray source, an examination object is scanned in a rotationally circulating fashion with a measured dose rate dependent on the circulation angle, projection data are collected from a multiplicity of viewing angles, and at least similarly redundant projection data from angularly identical or angularly complementary projection angles with a different measured dose, and thus a noise of different level, are interpolated relative to a projection value and are used for reconstruction.

BACKGROUND

It is generally known that measured data over an angular range of at least 180° are required in order to generate computed tomography displays from rotational scans of an examination object. However, as a rule measured data from a full circulation, that is to say a circulation above 360°, are used in order to reconstruct a CT slice image, or to reconstruct volume data. Since congruent beams with a complementary position of the X-ray source supply the same information, what is involved here is redundant data records that are certainly not mandatory in mathematical terms, but substantially improve the artifact behavior of such reconstructions. To this end, beams from one direction are interleaved with respectively complementary beams, that is to say beams in the opposite direction and, possibly an offset of the distance from the center of rotation.

It is possible in principle to use such radiation data in fan geometry directly and without rebinning for reconstruction. However, as a rule a starting point is the calculation in parallel geometry, which can, if appropriate, be produced by a so-called rebinning from data in fan geometry. Since such data do not satisfy the requirements of an equidistant distribution that is desired for an optimum reconstruction, the available projection data, which are present at different distances, are reinterpolated by a so-called radial interpolation on to an equidistant grid. Here, all the projection data are used with the same weight in accordance with their distance from the target point.

If dose rate data of the scanning X-ray tube are now modulated as a function of the scanning angle in order to reduce the surface dose of specific body regions, for example of chest and eye lenses, when scanning a patient, regions are produced in which a high noise level occurs in the imaging because of the low dose rate used.

SUMMARY

In at least one embodiment of the invention, a method for generating computed tomography displays is disclosed, in the case of which as little noise impairment as possible on the reconstructed image occurs despite dose modulation during scanning.

The inventors have realized that, in at least one embodiment, it is possible to carry out noise optimization on the reconstructed images when, during the interleaving of the projection data, not only is the weighting of the individual projections used performed as a function of the respective distance of the weighting center but, in addition, use is made of a weighting that also includes the noise behavior of the projections and complementary projections respectively used, this being done by undertaking a weighting that leads to as little noise as possible on the basis of the available statistics of the independent data of the original projections and complementary projections.

The inventive approach is described below, firstly assuming a parallel geometry. A more general approach employing fan geometry and 3D geometry follows later.

Considering, by way of example, the processing of CT data that have been recorded with the aid of a so-called phi spring focus (FFS) with an eighth offset, after the azimuth rebinning and the interleaving of the spring focus positions the result is firstly parallel projections with a half detector raster and eighth offset. These are then interleaved with the complementary beams such that 180° data are thereafter present on the quarter detector raster. In the last step, these data are reinterpolated by so-called radial interpolation on to an equidistant raster. If linear interpolation is used in this case, the calculation is performed in accordance with the following formula:

$$P_i = \frac{\sum_j [w(x_j^o - x_i)P_j^o + w(x_j^c - x_i)P_j^c]}{\sum_j [w(x_j^o - x_i) + w(x_j^c - x_i)]}. \quad (1)$$

Here, $x_j^o$ denotes the position (=distance from the center of rotation) of the original projection $P_j^o$, $x_j^c$ denotes the position of the complementary projection $P_j^c$, and $x_i$ denotes the positions of the target projection $P_i$. In the case of a linear weighting with a base width d, the weighting function w(x) is used as $$w(x) = \begin{cases} 1 - \frac{2|x|}{od} & \text{for } |x| < d/2 \\ \text{otherwise} \end{cases} \quad (2)$$

This interleaving uses all the projection data with the same weight in accordance with their distance from the target point. If a projection and its complementary projection have been recorded with the same dose, they have approximately the same noise, since they represent virtually the same beam in spatial terms. In this case, taking account with the same weight is optimum with reference to later image noise.

It may be pointed out that, within the meaning of at least one embodiment of the invention, original projections, or original projections $P_j^o$, on the one hand, and complementary projections, or complementary projections $P_j^c$, on the other hand, are to be understood respectively as oppositely directed projections that differ from one another only because of the location of the viewer, which is arbitrarily chosen in each case.

However, the noise of the projections differs when use is made of a modulated dose rate. Weighting equilibrium then leads to non optimal image noise. In the extreme case in which a projection direction uses a substantially smaller dose than the opposite direction, the noise of the weighted projection is determined virtually solely by the worse of the two projections.

It is known from statistics how statistically independent data of different noise or different variance must be weighted in order for the correspondingly weighted mean value to have minimal noise. Considering the previously described linear weighting, it is necessary for the formula described there now to be replaced by the formula $$P_i = \frac{\sum_j [f^o w(x_j^o - x_i) P_j^o + f^c w(x_j^c - x_i) P_j^c]}{\sum_j [f^o w(x_j^o - x_i) + f^c w(x_j^c - x_i)]}, \quad (3)$$

the relationship $f^o/f^c = (\sigma^c)^2/(\sigma^o)^2$ requiring to be fulfilled, $\sigma^o$ and $\sigma^c$ respectively representing the noise of the original projections and complementary projections. In order to obtain the centroid of the target projection $P_i$, the width of the weighting function should, furthermore, be adapted in such a way that at least two parallel channels of the projections and two channels of the complementary projections are used. The base width of the interpolation function is thereby at least $2(x_{j+1}^o - x_j^o)$.

Instead of linear interpolation functions, it is also possible to use other functions dependent on distance, without departing from the scope of the invention. Trapezoidal functions or splines are possible, inter alia.

Since a reduction in image sharpness takes place on the basis of the above described weighting, it is possible to compensate this sharpness reduction by steepening the convolution core in the filtered back projection, without worsening the sharpness/noise ratio in the process, as long as no frequency contributions at higher frequencies than the frequency of the first zero point of the interpolation function are to be represented.

Because of the reinterpolation from fan to parallel projections (rebinning), not all channels of a parallel projection necessarily have the same dose or the same noise. This is the case, particularly, in the region of the transition from normal to reduced dose. Consequently, it is necessary in this case to carry out noise weighting as a function of channel, that is to say the factors $f_j^o$ and $f_j^c$ depend on position and must locally fulfill the condition for the ratio of $f_j^o/f_j^c = (\sigma_j^c)^2/(\sigma_j^o)^2$.

This inventive method, of at least one embodiment, can be applied for all known scans in which complementary projections with a different dose or different noise are available. These are thus all scans in which more than 180° of parallel data are used, specifically both for a sequential technique and for a spiral technique. Also included in this case are so-called "retrospectively gated" and "prospectively triggered" reconstruction methods, particularly in the case of cardio CT, where more than 180° of parallel data are used.

Furthermore, in the course of an image reconstruction based on a back projection the method can also be applied with beam geometries other than planar parallel and equidistant beam geometry, that is to say, by way of example, a fan back projection or 3D back projection. Here, the pixel and voxel values are calculated by weighted sums over filtered projection data. For two-dimensional methods, let $P_{i,j}$ be the (filtered) projections used for the back projection. Each of these projections can be assigned an angle $\phi_{i,j}$ that denotes the direction of the beam with reference to an arbitrary, fixed reference direction. A complementary angle to an angle $\phi$ is obviously $\phi + 180°$ (modulo 360°).

For a pixel V to be reconstructed, let $d_{i,j}$ be the distance of the pixel from the beam $P_{i,j}$. The calculation known as back projection for the pixel V can then be written formally as $$V = \sum_i \sum_j w(d_{i,j}) g_{i,j} P_{i,j}, \quad (4)$$

w representing a suitable, usually linear, normalized weighting function. The additional weights $g_{i,j}$ are to be chosen in such a way that for each $\phi$ the sum of all the weights of the beams contributing to V, that is to say $w(d_{i,j}) \neq 0$, where $\phi_{i,j} = \phi$ and $\phi_{i,j} = \phi + 180°$ is equal to 1.

In addition, it is now possible in accordance with at least one embodiment of the inventive method to take account of each beam in accordance with its noise $\sigma_{i,j}$ individually and optimally in the sense that the noise of the pixel value V is minimized. To this end, the calculation must be replaced by $$V = \sum_i \sum_j w(d_{i,j}) \frac{g_{i,j}}{(\sigma_{i,j})^2} P_{i,j}, \quad (5)$$

it now being necessary for the variables $$\frac{g_{i,j}}{(\sigma_{i,j})^2}$$

to fulfill the condition that for each $\phi$ the sum of all the effective weights $$\frac{g_{i,j}}{(\sigma_{i,j})^2}$$

of the beams, contributing to V, with $\phi_{i,j} = \phi$ and $\phi_{i,j} = \phi + 180°$ is equal to 1.

The above statements can also be applied in a simple way to the 3D back projection of projection data $P_{i,j,k}$ that, alongside the projection angle $\phi_{i,j,k}$, the angle of the beam projected on to that plane E in which the rotation axis of the X-ray source forms a normal, and the distance $d_{i,j,k}$ from the voxel V, additionally have a cone angle $\lambda_{i,j,k}$ that is to say an angle between E and the beam $P_{i,j,k}$. In this case, the voxel value is calculated in accordance with the formula $$V = \sum_i \sum_j \sum_k w(d_{i,j,k}) \frac{g_{i,j,k}}{(\sigma_{i,j,k})^2} P_{i,j,k}, \quad (6)$$

the variables $$\frac{g_{i,j,k}}{(\sigma_{i,j,k})^2}$$

being required to fulfill the condition that for each $\phi$ the sum of all effective weights $$\frac{g_{i,j,k}}{(\sigma_{i,j,k})^2}$$

of the beams, contributing to V, with $\phi_{i,j,k} = \phi$ and $\phi_{i,j,k} = \phi + 180°$ is equal to 1.

In accordance with this basic idea of at least one embodiment of the invention as set forth above, the inventors firstly propose in a fashion that is generally valid and independent of the type of reconstruction chosen to improve the method known per se, for generating computed tomography displays, wherein firstly in a known way with the aid of at least one X-ray source, an examination object is scanned in a rotationally circulating fashion with a measured dose rate dependent on the circulation angle, projection data are collected from a multiplicity of viewing angles, and at least similarly redundant projection data from angularly identical or angularly complementary projection angles with a different measured dose are interpolated with distance weighting relative to a projection value and are used for reconstruction. The inventive improvement of this method consists in that the reinterpolation of the at least partially redundant projection data is carried out with the aid of a noise optimizing weighting as a function of the noise present per projection value.

In the case of a reconstruction calculation on the basis of planar or quasiplanar projection data, the following formula for calculating the pixel values $V_{2d}$ can be used for weighting the similarly redundant projection data:

$$V_{2d} = \sum_i \sum_j w(d_{i,j}) \frac{g_{i,j}}{(\sigma_{i,j})^2} P_{i,j},$$

in which case the sums of all the effective weights $$\frac{g_{i,j}}{(\sigma_{i,j})^2}$$

for each angle $\phi$ of the beams, contributing to the pixel $V_{2d}$, with $\phi_{i,j}=\phi$ and $\phi_{i,j}=\phi+180°$ is equal to 1, and it holds that:

$w(d_{i,j})$=weighting factor of the projection value $P_{i,j}$ with the distance $d_{i,j}$ of the voxel $V_{2d}$ from the beam belonging to the projection value $P_{i,j}$;

$g_{i,j}$=weighting factor for taking account of the noise of the projection value $P_{i,j}$;

$\sigma_{i,j}$=noise of the projection value $P_{i,j}$.

In the case of a 3D reconstruction on the basis of 3D projection data, the following formula for calculating the voxel values ($V_{3D}$) can be used for weighting the similarly redundant projection data ($P_{i,j,k}$):

$$V_{3D} = \sum_i \sum_j \sum_k w(d_{i,j,k}) \frac{g_{i,j,k}}{(\sigma_{i,j,k})^2} P_{i,j,k},$$

in which the variables $$\frac{g_{i,j,k}}{(\sigma_{i,j,k})^2}$$

must fulfill the condition that for each angle $\phi$ the sum of all the effective weights $$\frac{g_{i,j,k}}{(\sigma_{i,j,k})^2}$$

of the beam, contributing to the voxel $V_{3D}$, with $\phi_{i,j,k}=\phi$ and $\phi_{i,j,k}=\phi+180°$ is equal to 1, and it holds that:

$w(d_{i,j,k})$=weighting factor of the projection value $P_{i,j,k}$ with the distance $d_{i,k,j}$ of the voxel $V_{3D}$ from the beam belonging to the projection value $P_{i,j,k}$;

$g_{i,j,k}$=weighting factor for taking account of the noise of the projection value $P_{i,j,k}$; and $\sigma_{i,j,k}$=noise of the projection value $P_{i,j,k}$.

If, in an optional variant of at least one embodiment of the method, the projection data are reinterpolated before the reconstruction calculation by a radial interpolation on to an equidistant raster, a concrete configuration of the inventive method can provide that the weighted radial interpolation of the projection data ($P_j^o$, $P_j^c$) on to an equidistant raster is calculated in accordance with the formula $$P_i = \frac{\sum_i [f_j^o w(x_j^o - x_i) P_j^o + f_j^c w(x_j^c - x_i) P_j^c]}{\sum_j [f_j^o w(x_j^o - x_i) + f_j^c w(x_j^c - x_i)]}$$

in which $P_i$ represents the equidistant target projection, $P_j^o$ represents the original projection, $P_j^c$ represents the complementary projection, $w(x_j^o-x_i)$ represents the distance dependent weighting factor of the original projection $P_j^o$, $w(x_j^c-x_i)$ represents the distance dependent weighting factor of the complementary projection $P_j^c$, $x_j^o$ represents the position (=distance from the center of rotation) of the original projection $P_j^o$, $x_j^c$ represents the position of the complementary projection $P_j^c$, and $x_i$ represents the position of target projection $P_i$, and the condition $$f_j^o/f_j^c = (\sigma_j^c)^2/(\sigma_j^o)^2$$

is fulfilled, where $f_j^o$ is the noise dependent weighting factor for the original projection $P_j^o$, $f_j^c$ is the noise dependent weighting factor for the complementary projection $P_j^c$, $\sigma_j^o$ is the noise for the original projection $P_j^o$, and $\sigma_j^c$ is the noise for the complementary projection $P_j^c$.

In a development of at least one embodiment of this method, it is, furthermore, proposed with reference to all the variants that an unsharpness produced by the noise optimizing weighting is compensated during the reconstruction calculation by a steepening of the convolution core in the case of the filtered back projection. If, for example, w is a linear weighting function as described in formula (2), the steepening of the convolution core can reside in multiplying the Fourier coefficients of the core by the function $1/\cos^2(p\pi d/2)$, $p$ representing the spatial frequency.

Furthermore, the inventors propose, in at least one embodiment, that in the weighting use is made exclusively of the equal number of original projections and complementary projections that is closest to the target projection. It is thereby possible for example, to make use exclusively of the two original projections and two complementary projections that are closest to the target projection.

As already mentioned further above, it is possible according to at least one embodiment of the invention for the projection data to originate from sequential scans or from spiral scans. The projection data can originate by means of a number of focuses/spring focuses of at least one X-ray tube, or from the scanning of a number of X-ray tubes.

It may be pointed out that at least one embodiment of the inventive method can also be used in conjunction with so-called dual-energy scans.

In addition to the above described at least one embodiment of the method, there is also present within the scope of the invention at least one embodiment of an X-ray computed tomography system for generating tomographic displays of an examination object with the aid of an arithmetic logic unit, including computer program code for evaluating detector data and carrying out a reconstruction, the arithmetic logic unit including program code that during operation executes the inventive method steps of at least one embodiment described above.

BRIEF DESCRIPTION OF THE DRAWINGS

The embodiment is described in more detail below with the aid of the figures, only the features required to understand the invention being illustrated. The following reference symbols are used here: 1: CT system; 2: first X-ray tube; 3: first detector; 4: second X-ray tube; 5: second detector; 6: gantry housing; 7: patient; 8: moveable patient couch; 9: system axis; 10: arithmetic logic unit; 11: memory; 12: sector; 13: sector; $Prg_1$ to $Prg_n$: computer programs; $\alpha_1$, $\beta_2$: angular ranges; $P_i$: equidistant target projection; $P_j^o$: original projection; $P_j^c$ complementary projection; $w(x_j^o - x_i)$: distance dependent weighting factor of the original projection $P_j^o$: $w(x_j^c - x_i)$: distance dependent weighting factor of the complementary projection $P_j^c$; $x_j^o$: position of the original projection $P_j^o$; $x_j^c$ position of the original projection $P_j^c$; $x_i$: position of the target projection $P_i$; $f_j^o$: noise dependent weighting factor for the original projection $P_j^o$; $f_j^c$: noise dependent weighting factor for the complementary projection $P_j^c$; $\sigma_j^o$: noise for the original projection $P_j^o$; $\sigma_j^c$: noise for the complementary projection $P_j^c$.

In detail.

DETAILED DESCRIPTION OF THE EXAMPLE EMBODIMENTS

Figure 1:
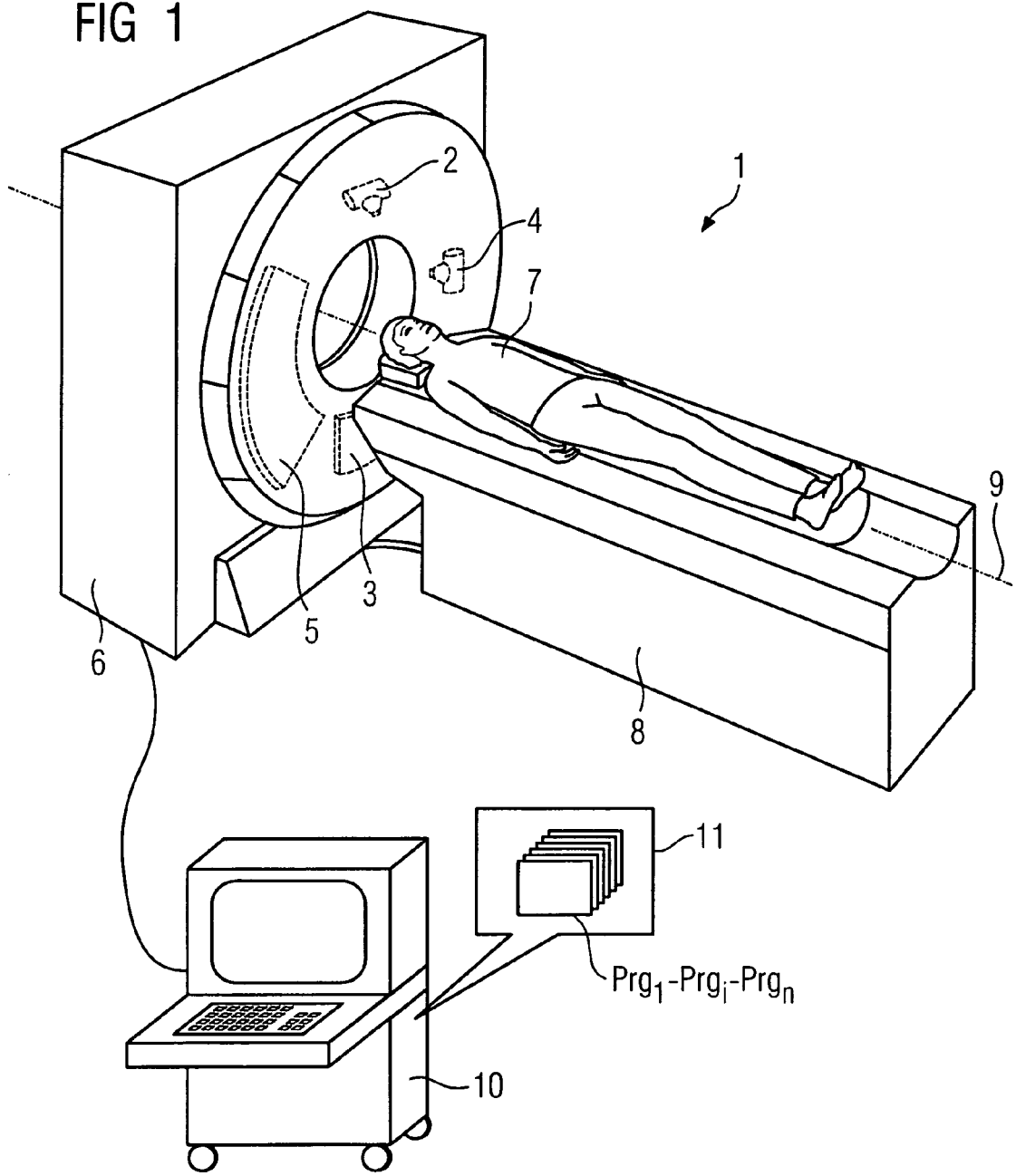
FIG. 1 shows a 3D schematic of an inventive X-ray CT system.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows an example embodiment of a CT system 1 having a gantry housing 6 and a displaceable patient couch 8, including an arithmetic logic unit 10 for operating the CT system. A patient 7 is located on the displaceable patient couch 8 that can be pushed during a scan along the system axis 9 through a measuring field between the X-ray tube 2 and a detector 3 lying opposite, while the X-ray tube 2 and the detector 3 move in a fashion rotating about the patient 7. This gives rise to the known spiral scanning of the patient, it being possible to reduce the dose rate in specific angular ranges in order to protect the patient. For example, the possibility is thereby provided of reducing the dose rate of the eyes or other particularly sensitive body regions. In addition, instead of a single X-ray tube it is also possible to use one further or two further X-ray tubes—illustrated here by the second X-ray tube 4 and the detector 5 lying opposite—for scanning.

In order to control the CT system 1 and to evaluate the detector data received, computer programs, that is to say program codes $Prg_1$ to $Prg_n$ that carry out the appropriate methods during operation are stored in a mirror 11 in the arithmetic logic unit 10. Denoted here by way of example is a program $Prg_i$ that is intended to execute an embodiment of the inventive method.

Figure 2:
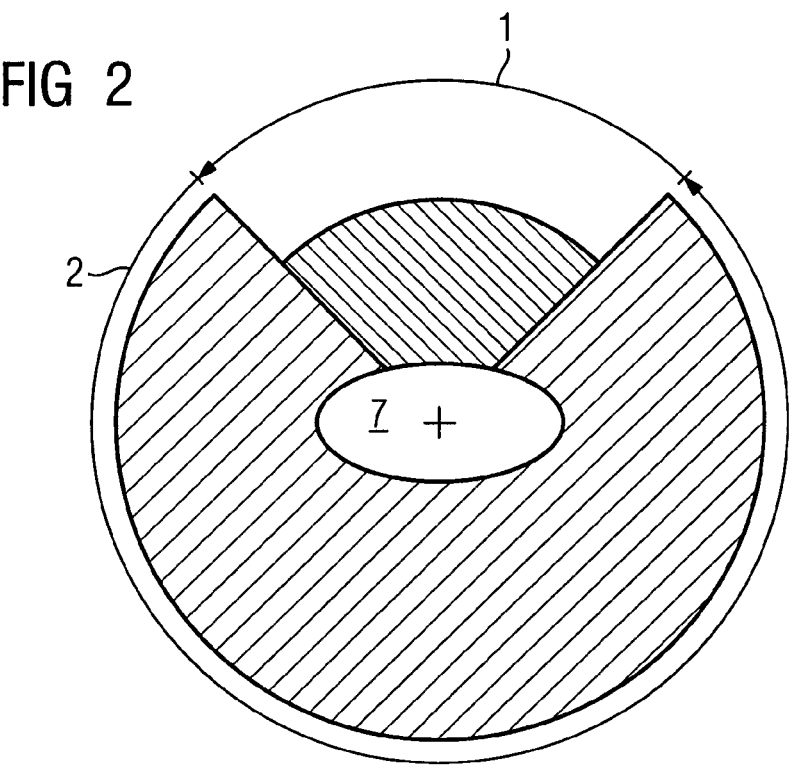
FIG. 2 shows a schematic of the scanning regions in the case of a modulated dose rate.

A dose modulation of the X-ray tube(s) is shown schematically in FIG. 2. Illustrated in the angular range $\alpha_1$ is a sector 12 that corresponds to the dose rate used in this region, while there is illustrated over the angular range $\alpha_2$ another sector 13, which corresponds to the dose rate in this region. The dose rate used in the respective angular range corresponds here to the radius of the sectors 12 and 13 illustrated by hatching. As may be seen from this illustration, the patient 7, who is shown at the center in cross section, is struck in specific angular ranges by beams and complementary beams thereof that have different dose rates. In accordance with the dose rate, the dose available for a measurement of a specific beam also differs. Since, on the basis of the existing quantum statistics of the X-ray used, the noise represents a function of the dose, two mutually complementary projection data which have been recorded with the aid of beams of different dose rate also have a different noise level.

Figure 3:
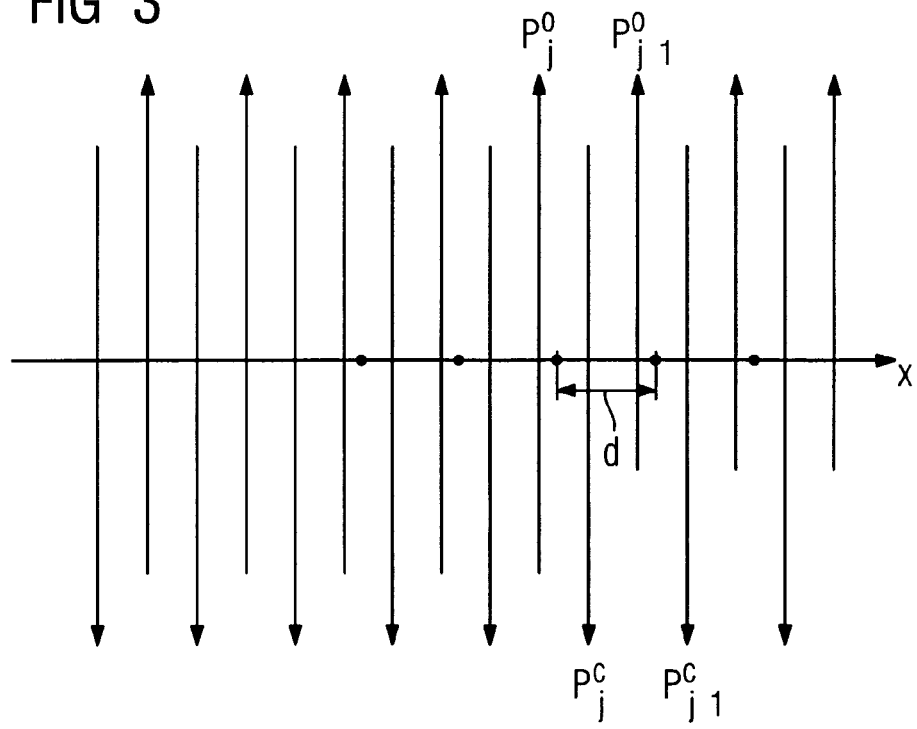
FIG. 3 shows an example parallel projection data record based on different doses used to generate a projection value.

Such a situation in the region of the transition between a first angular range $\alpha_1$ and the second angular range $\alpha_2$ is shown in FIG. 3. The original projections $P_j^o$ are shown here in a fashion illustrated by arrows above the x-axis, the complementary projections $P_j^c$ likewise being plotted on the x-axis, in the opposite direction. The length of the arrows of the projections in this case represents the size of the dose used for determining the respective projection value.

In order to carry out a radial interpolation on to an equidistant raster, as shown in the points on the x-axis, projections and complementary projections with a different noise behavior, that is to say obtained from different dose rate ranges, are now used for an interpolation, and in an inventive way not only does the distance of the respectively used projection feature in the calculation, but it is also necessary to take account of the noise behavior of the projections used for the interpolation such that a noise optimization takes place during the interpolation.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

It goes without saying that the above named features of the invention can be used not only in the respectively specified combination, but also in other combinations or on their own without departing from the scope of the invention.

What is claimed is:

1. A method for generating computed tomography images, comprising:

scanning, with the aid of at least one X-ray source, an examination object in a rotationally circulating fashion with a dose rate, the dose rate being based on a circulation angle of the circulating;

collecting projection data from a multiplicity of projection beams at projection angles; and interpolating redundant projection data, the redundant projection data having identical or complementary projection angles, the redundant projection data being weighted based on distances from target projections and being produced at different dose rates;

carrying out, during the interpolating, additional noise optimizing weighting as a function of noise associated with the projection data; and reconstructing an image based on the interpolating and the additional noise optimizing weighting.

2. The method as claimed in claim 1, wherein the reconstructing includes calculating pixel values as follows $$V_{2d} = \sum_i \sum_j w(d_{i,j}) \frac{g_{i,j}}{(\sigma_{i,j})^2} P_{i,j},$$

wherein $V_{2d}$ is a pixel value, $P_{i,j}$ is a projection value for an original projection $P_j$ and a target projection $P_i$, $g_{i,j}$ is a weighting factor, and $\sigma_{i,j}$ is noise of the projection value $P_{i,j}$, a sum of all effective weights $$\frac{g_{i,j,k}}{(\sigma_{i,j,k})^2}$$

for each projection angle contributing to the pixel value $V_{2d}$ is equal to 1, and $w(d_{i,j})$ is a weighting factor of the projection value $P_{i,j}$ with a distance $d_{i,j}$ of the pixel value $V_{2d}$ from the projection beam associated with the projection value $P_{i,j}$.

3. The method as claimed in claim 1, wherein the reconstructing includes calculating voxel values as follows $$V_{3D} = \sum_i \sum_j \sum_k w(d_{i,j,k}) \frac{g_{i,j,k}}{(\sigma_{i,j,k})^2} P_{i,j,k},$$

wherein $V_{3D}$ is a voxel value, $P_{i,j,k}$ is a projection value for an original projection $P_j$, a target projection $P_i$ and the projection angle, $g_{i,j,k}$ is a weighting factor, and $\sigma_{i,j,k}$ is noise of the projection value $P_{i,j,k}$, a sum of all the effective weights $$\frac{g_{i,j,k}}{(\sigma_{i,j,k})^2}$$

for each projection angle contributing to the voxel value $V_{3D}$ is equal to 1, and $w(d_{i,j,k})$ is a weighting factor of the projection value $P_{i,j,k}$ with the distance $d_{i,j,k}$ of the voxel value $V_{3D}$ from the projection beam associated with the projection value $P_{i,j,k}$.

4. The method as claimed in claim 1, further comprising: reinterpolating the projection data onto an equidistant grid by a radial interpolation before the reconstructing.

5. The method as claimed in claim 4, wherein the radial interpolation of the projection data is calculated on an equidistant grid in accordance with the formula $$P_i = \frac{\sum_i [f_j^o w(x_j^o - x_i) P_j^o + f^c w(x_j^c - x_i) P_j^c]}{\sum_j [f^o w(x_j^o - x_i) + f^c w(x_j^c - x_i)]},$$

wherein $P_i$ represents an equidistant target projection of the projection data, $P_j^o$ represents an original projection, $P_j^c$ represents a complementary projection of the original projection, $w(x_j^o - x_i)$ represents a distance dependent weighting factor of the original projection $P_j^o$, $w(x_j^c - x_i)$ represents a distance dependent weighting factor of the complementary projection $P_j^c$, $x_j^o$ represents the position of the original projection $P_j^o$, $x_j^c$ represents a position of the complementary projection $P_j^c$, and $x_i$ represents a position of the target projection $P_i$, and the condition $$f_j^o/f_j^c = (\sigma^c)^2/(\sigma^o)^2$$

is fulfilled, where $f_j^o$ is a noise dependent weighting factor for the original projection $P_j^o$, $f_j^c$ is a noise dependent weighting factor for the complementary projection $P_j^c$, $\sigma_j^o$ is noise for the original projection $P_j^o$, and $\sigma_j^c$ is noise for the complementary projection $P_j^c$.

6. The method as claimed in claim 1, wherein an unsharpness produced by the noise optimizing weighting is compensated during the reconstructing by steepening a convolution core for the projection data.

7. The method as claimed in claim 1, wherein the collecting includes a number of original projections and complementary projections that are closest to a target projection and that are equal.

8. The method as claimed in claim 7, wherein use is made exclusively of the number of original projections and the number of complementary projections that are closest to the target projection are two.

9. The method as claimed in claim 1, wherein the projection data originate from sequential scans.

10. The method as claimed in claim 1, wherein the projection data originate from a spiral scan.

11. The method as claimed in claim 1, wherein the projection data are produced by at least one spring focus.

12. The method as claimed in claim 1, wherein the projection data originate from the scanning of a number of X-ray tubes.

13. The method as claimed in claim 1, wherein the projection data originate from gated scans for examining at least partially moving examination objects.

14. The method as claimed in claim 1, wherein the projection data originate from triggered scans for examining at least partially moving examination objects.

15. The method as claimed in claim 1, wherein the projection data originate from a focus-detector system.

16. The method as claimed in claim 1, wherein the projection data originate from a number of simultaneously operated focus-detector systems.

17. An X-ray computed tomography system for generating tomographic displays of an examination object, comprising:
an arithmetic logic unit, including computer program code for evaluating detector data and carrying out a reconstruction, wherein the arithmetic logic unit includes program code, that during operation of the arithmetic unit, executes the method of claim 1.

18. The X-ray computed tomography system as claimed in claim 17, further comprising a focus-detector system.

19. The X-ray computed tomography system as claimed in the claim 17, further comprising at least two focus-detector systems.

20. A non-transitory computer readable medium including program segments for, when executed on a computer device, causing the computer device to implement the method of claim 1.

21. An X-ray computed tomography system for generating tomographic images of an examination object, comprising:

means for scanning, with the aid of at least one X-ray source, an examination object in a rotationally circulating fashion with a dose rate, the dose rate being based on a circulation angle of the circulating;

means for collecting projection data from a multiplicity of projection angles;

means for interpolating redundant projection data, the redundant projection data having identical or complementary projection angles, the redundant projection data being weighted based on distances from target projections and being produced at different dose rates;

means for carrying out configured to, during the distance weighted interpolation of the at least similarly redundant projection data, carry out additional noise optimizing weighting as a function of noise associated with the projection data; and means for reconstructing an image based on the interpolated redundant projection data and the distance weighted interpolation of the redundant projection data.

22. The X-ray computed tomography system as claimed in claim 21, further comprising a focus-detector system.

23. The X-ray computed tomography system as claimed in the claim 21, further comprising at least two focus-detector systems.

* * * * *